Sept. 15, 1970          B. BLUM ET AL          3,528,800
OPTIMIZED BLOWING CONTROL FOR BASIC OXYGEN FURNACES
Filed Feb. 14, 1966          3 Sheets-Sheet 1
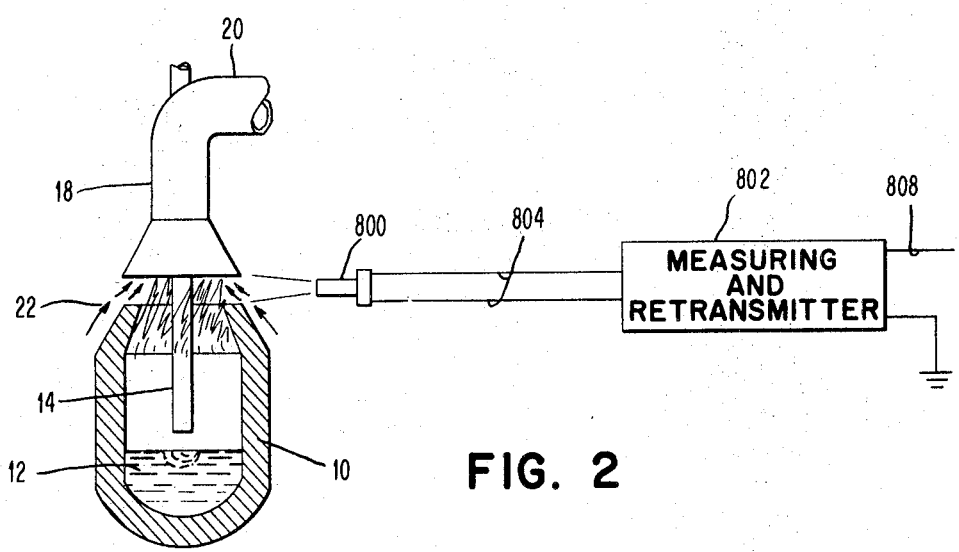
INVENTORS
BERNARD BLUM
JOHN W. SCHWARTZENBERG
BY William G. Miller Jr.
AGENT

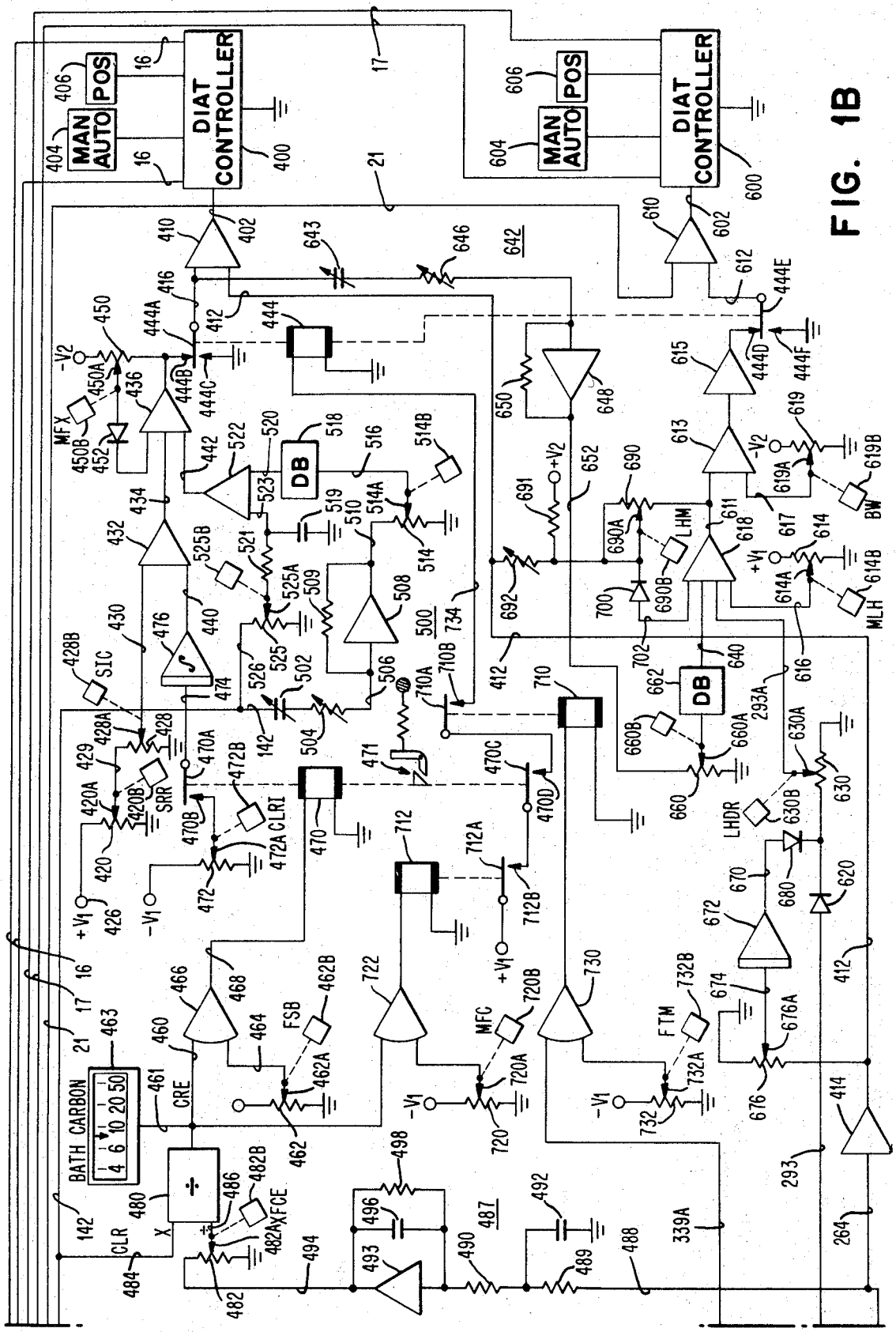

3,528,800
OPTIMIZED BLOWING CONTROL FOR BASIC
OXYGEN FURNACES
Bernard Blum, Kenmore, N.Y., and John W. Schwartzenberg, Maple Glen, Pa., assignors to Leeds & Northrup Company, Philadelphia, Pa., a corporation of Pennsylvania
Continuation-in-part of application Ser. No. 479,867, Aug. 16, 1965. This application Feb. 14, 1966, Ser. No. 534,617
Int. Cl. C21c 7/00
U.S. Cl. 75—60   12 Claims

ABSTRACT OF THE DISCLOSURE

A system for controlling the operation of a basic oxygen furnace in response to measurements of the carbon loss through the exhaust gases and the oxygen flow rate to the lance. The carbon content of the bath as determined from the carbon loss rate and the measured oxygen flow rate as well as the calculated bath temperature provide a basis for controlling the furnace. Oxygen flow is maintained constant until silicon is removed and is then increased at a steady maximum rate. Simultaneously, the lance is brought down as slag build-up occurs. Oxygen flow is modified by positive feedback signal responsive to carbon loss rate and is limited when carbon loss rate changes rapidly. Also, lance height is modified in response to rate of change of oxygen flow. The oxygen is then shut off and the lance raised when the carbon content of the bath, as determined from carbon loss rate divided by oxygen flow, is at a desired value and the temperature of the bath is also at a desired value.

This application is a continuation-in-part of application Ser. No. 479,867, filed Aug. 16, 1965, now abandoned.

This invention relates to a method and apparatus for providing control of the blowing of a basic oxygen furnace so as to produce a heat of steel in the shortest time with a minimum of oxygen consumption, more particularly the invention relates to a method and means for controlling continuously the oxygen flow to the lance of such a furnace and the height of the lance above the bath in the furnace so as to produce such optimum conditions.

The process of refining pig iron to produce steel in a basic oxygen furnace is carried out by the introduction of high purity oxygen through a lance positioned above the bath in the furnace. The oxygen is introduced in a high velocity stream which impinges upon the surface of the bath, sometimes penetrating it. In this process the high purity oxygen combines with the impurity elements of the bath such as carbon, manganese, phosphorus, and silicon as well as with the iron itself. By the process of this combination the oxides of the impurity elements are formed. The oxides of carbon are evolved as gases while other oxides are retained in a slag cover over the molten metal.

It is usually desired that the refining process be carried out in as short a time period as possible and with a minimum usage of high purity oxygen. The process, of course, must be continued until the desired reduction in the percentage of the impurities has been accomplished. The most important of these impurities is, of course, the carbon present in the bath and therefore the percentage of carbon in the molten metal as well as the temperature of the molten metal are usually the factors which determine the point at which the refining process is terminated.

In carrying out this process in a minimum time period and with a minimum consumption of oxygen it is desirable to control the action of the oxygen stream or jet on the bath, and to control the rate at which the oxygen is fed to the bath. These controlling actions are accomplished by controlling the positioning of the lance with respect to the molten metal bath and its slag cover and by controlling the oxygen flow itself.

Generally speaking, it is desirable to supply oxygen at a maximum possible rate in order to minimize the time period required for the completion of a heat and it is also desirable to position the lance as closely as possible to the bath of the furnace so that a maximum amount of stirring of the bath occurs. It is, however, necessary to control the oxygen flow and the lance height above the bath so that there will be prevented any undesirable actions in the process or damage to the lance or furnace or danger to the operators.

Among the undesirable actions which must be avoided in the process are those process related problems which are referred to as side reactions, sparking and slopping. All of these actions must be substantially reduced or eliminated to achieve efficient blowing practice.

There are two major side reactions with which blowing practice is concerned. One of the side reactions is the formation of carbon dioxide in the vessel and the other is the formation of FeO in the slag cover of the bath beyond the amount required for a good slag. The formation of $CO_2$ in the vessel takes place either when there is a very high lance position which restricts the reaction of the oxygen jet with the bath or when there is a very high blowing rate, that is a high rate of supply of oxygen to the lance. In both cases the oxygen which does not react with the bath reacts above the bath with the carbon monoxide present to form carbon dioxide. A high slag FeO may also result when the lance is too high, for then the oxygen instead of reacting with the bath reacts with the slag forming FeO.

High slag FeO's can also be formed early in the blowing when the rate of oxygen supply is high and silicon is still in the bath. The silicon tends to inhibit carbon removal from the bath by the oxygen and therefore tends to limit the rate at which the oxygen can be utilized by the bath. Therefore, if the oxygen supply is excessive the excess oxygen will form FeO. The excess slag FeO will also be formed if blowing is continued beyond the point at which the carbon has essentially been removed, namely a carbon percentage of approximately .04.

The sparking action which is referred to above as being an undesirable process action is the metal splashing caused by a combination of a low lance height and high oxygen flow rate. The amount of sparking is also affected by the amount of slag present, for the slag being more viscous than the molten iron or steel provides a blanket for the bath which tends to prevent the undesirable metal splashing. One of the undesirable results of such metal splashing is the damage which can be caused to the lance itself.

Still another undesirable process action which must be minimized is the action called "slopping." Slopping is the ejection of slag from the bath. It is believed to be caused by the reaction at the slag-metal interface of a high FeO slag and a high carbon metal in the absence of silicon. Slopping can therefore be prevented by holding the slag FeO content down when the bath carbon content is high and the silicon is low.

In addition to the above-mentioned process actions which are undesirable and therefore must be reduced or prevented for an optimum blowing practice, there are other aspects of the process which must be considered in developing an optimum blowing practice. One of these is a rapid change in the position or location of the reaction zone. This can be caused either by a change in lance height or oxygen flow. For optimum blowing practice it is desirable that any change in the reaction zone location should be made slowly so as not to trigger violent bath reactions.

In the past the control of oxygen flow and of lance height has been manual and has been determined more by the personal idiosyncrasies of the operator in charge of the blowing of the heat rather than by any consistent and efficient program capable of minimizing the period of time required for the heat and the oxygen quantity required while at the same time maintaining a stable process action to avoid damage to the equipment and danger to the personnel.

It is therefore an object of this invention to provide an improved method for blowing a basic oxygen furnace.

It is a further object of this invention to provide a method for blowing a basic oxygen furnace which is capable of minimizing the time required for the completion of a heat and at the same time minimizing undesirable process actions.

A still further object of this invention is the provision of an improved apparatus for the control of the blowing operation in a basic oxygen furnace.

A still further object of this invention is the provision of an apparatus for controlling the blowing operations so as to avoid undesirable process actions while optimizing the production by minimizing the time required and the amount of oxygen required for the process.

A still further object of this invention is the provision of apparatus for controlling the blowing of a basic oxygen furnace so as to prevent slopping, sparking and side reactions during the process.

A still further object of this invention is the provision of apparatus for controlling the oxygen flow to the lance and the height of the lance above the bath of a basic oxygen furnace so as to minimize the blowing time and the oxygen consumption during the process while preventing undesirable process action such as slopping, sparking and side reactions.

In carrying out the above objects the present invention in one form provides a method for controlling the blowing of a basic oxygen furnace comprising the steps of supplying oxygen to the lance of the furnace during the initial silicon removal period at the maximum rate at which the oxygen can be used during that period without the production of an excessive FeO in the slag cover of the bath, and the subsequent increasing of the oxygen flow to the lance at a predetermined maximum rate after the silicon has been removed from the bath. This maximum rate is desirably that which is the highest usable rate which will still prevent or avoid undesirable process actions in the furnace. A subsequent step in the process is the cutting off of the flow of oxygen to the lance when the carbon content of the bath and the temperature of the bath have reached the desired values.

The present invention also utilizes novel means for the control of the oxygen blowing of the basic oxygen furnace. These means include means for establishing a preset signal indicative of the maximum rate at which the oxygen can be reacted with the bath during the initial silicon removal phase of the blowing cycle.

Other means are provided which are responsive to a calculated carbon loss efficiency ratio of the furnace and which are operable upon the carbon loss efficiency ratio reaching a predetermined value to initiate a signal which increases at the maximum usable rate. Further means are provided for producing a modifying signal in accordance with the rate of change of the calculated carbon-loss rate. The preset signal, the increasing signal and the modifying signal are then combined by another means to produce a signal indicative of the desired oxygen flow which oxygen flow will be the maximum which can be tolerated by the process without undesirable reactions being created. The invention also includes means for changing the flow of oxygen to the lance until the actual flow corresponds with the desired value as represented by the desired oxygen signal.

In carrying out the invention it is also necessary that the lance height be controlled. Such control is accomplished by utilizing means for establishing a signal indicative of slag formed on the bath in the furnace and additional means are provided for establishing a signal related to the rate of change of oxygen flow to the lance. The lance height is then controlled to a position below a maximum height in response to the combination of the signal indicative of the amount of slag formed and the signal indicative of the rate of change of oxygen flow. The polarity of those signals is such that a rapid increase in oxygen flow will cause a raising of the height of the lance whereas a rapid decrease in oxygen flow will cause a compensatory lowering of the lance.

For a more detailed understanding of the invention and for an illustration of a preferred form thereof, reference is made to the drawings in which:

FIG. 1 is a diagram showing a manner in which FIG. 1A and FIG. 1B may be juxtaposed to provide a complete diagram of a preferred form of the invention.

FIG. 1B is a diagrammatic showing of a preferred analog computation circuit for utilizing the process quantities measured by the circuit of FIG. 1A to affect the desired blowing control as set forth in the objects of this invention.

FIG. 2 is a partial diagram showing a modification of one portion of the circuit of FIGS. 1A and 1B.

Figure 1A:
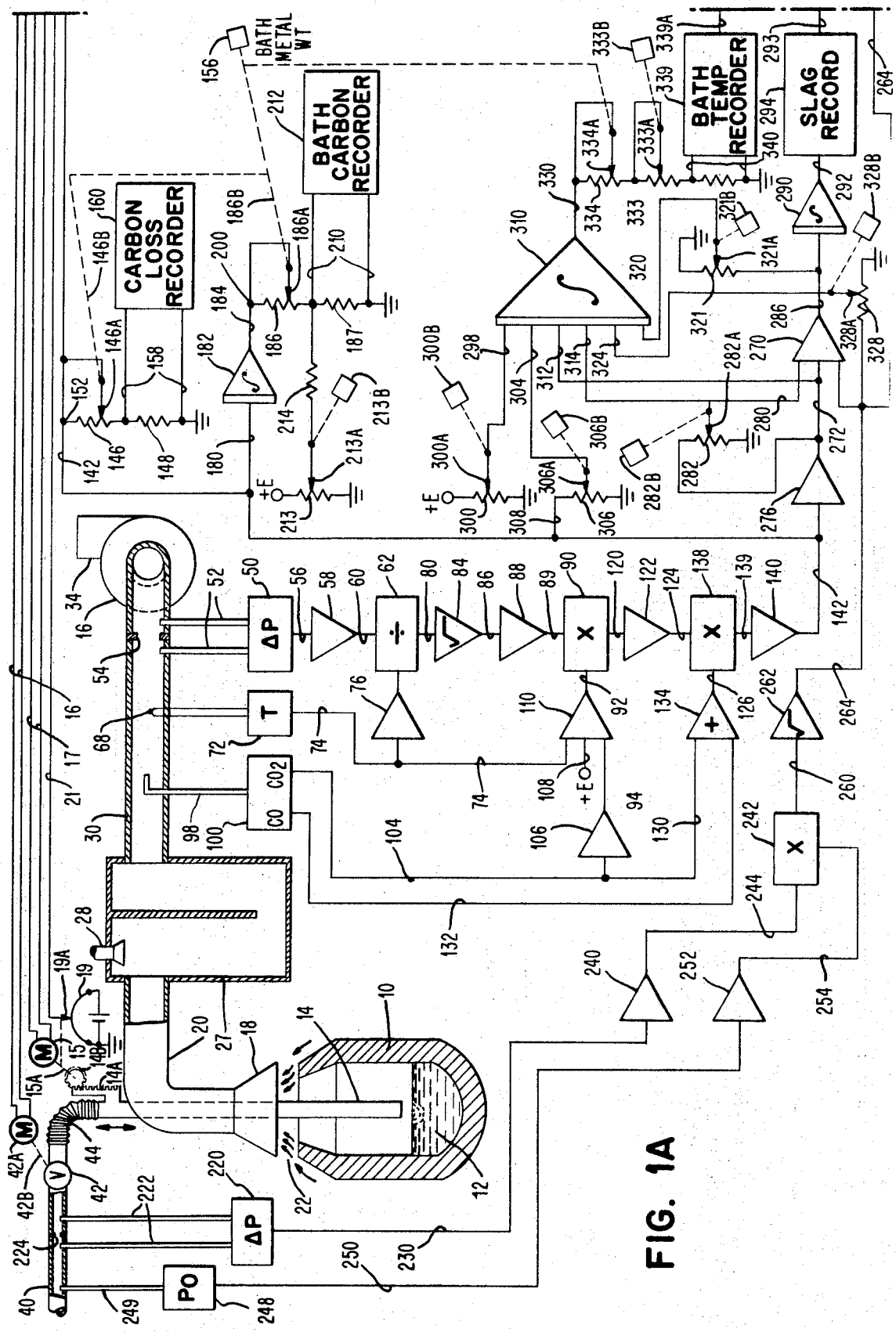
FIG. 1A is a diagrammatic showing of a preferred analog computation circuit for providing the necessary process measurements for carrying out the objects of this invention.

With reference to FIG. 1A the refining vessel 10 serves as a furnace for containing the molten metal bath 12. During the refining process high purity oxygen is introduced through a lance 14 at a high velocity so as to impinge upon the surface of the bath 12. The resulting refining process produces carbon monoxide and a small amount of carbon dioxide gas in the region of the metal bath 12. These gases are drawn off by a draft induced by a fan 16 into the gas recovery system by way of hood 18 and the exhaust duct 20. As the gases leave the vessel 10 and enter the hood 18 there is induced a flow of air from outside of the vessel 10 as indicated by the arrows 22. The air so induced combines with the carbon monoxide to produce more carbon dioxide, thus leaving only a small amount of carbon monoxide in the exhaust gases in the usual refining process. In some refining processes, however, the hood 18 is arranged to have a closer coupling with the refining vessel 10. That arrangement minimizes the induction of air from the outside and results in a greater percentage of carbon monoxide being present in the exhaust gases.

The exhaust gases coming prom the pipe 20 are introduced into a spark box 27 which is provided with a water spray nozzle 28 from which cooling water is continually sprayed. The spark box serves not only as a means for cooling the exhaust gases but also as a means for removing a considerable amount of the solid material contained in the exhaust gases. Provisions, not shown, are usually made for the entrapment of the solid material so as to maintain the exhaust gases as clean as possible.

It should be recognized that in the usual installation the hood 18 and the exhaust duct 20 must of necessity be water cooled because of the extremely high temperatures of the gases evolved from the refining process. After the gases have been further cooled by the water spray from nozzle 28 they are introduced into exhaust duct 30 from which the fan 16 draws them into the stack 34.

As will be evident from FIG. 1A the high purity oxygen is introduced into the refining process by way of pipe 40 through valve 42 and the connected flexible piping 44 and lance 14. Valve 42 is positioned by motor 42A through coupling 42B. Lance 14 is arranged to be movable by the positioning of its attached rack 14A by associated pinion gear 14B which is in turn rotated by positioning motor 15 by way of coupling 15A so that it may have its open end positioned at a height above the surface of the bath 12 as may be desirable for proper operation of the refiing process as established by the control circuit to be described subsequently.

Motor 42A is connected by lines 16 to the circuits for controlling the oxygen flow. The motor 15 is connected by lines 17 to the circuits for controlling the lance height. The motor 15 is connected by a coupling 15A to movable slidewire contact 19A of slidewire 19 so as to tap off a portion of the voltage of source E placed across slidewire 19. This portion of E represents the position of lance 14 by a potential which is fed back to the lance height control by way of line 21. The other circuit connection is provided by the grounded negative terminal of source E.

It is necessary for the measurements upon which the lance height and oxygen flow control are based to be as accurate as possible both for the proper adjustment of valve 42 and for proper positioning of the lance 14 during various phases of the refining process. The extremely difficult conditions presented by this process make it necessary that these process variables be measured by indirect means as by inferring their magnitudes from the magnitudes of other more easily measured variables. In this connection the exhaust gases at a point after the water spray are a source of a portion of the information used to make the necessary inferential measurements. Therefore, there is provided a means for measuring the flow of exhaust gases in duct 30. This means is shown in the FIG. 1 as the differential pressure measuring apparatus 50 which is connected by taps 52 across a source of pressure drop in the exhaust duct 30, shown schematically as an orifice plate 54.

The differential pressure instrument 50 provides at output line 56 a signal indicative of the pressure drop across the orifice plate 54. The signal on line 56 is then amplified by isolating amplifier 58 to provide an input on line 60 to a dividing network shown as block 62.

The dividing network 62 is utilized for the introduction of a temperature compensation for the flow measurement. In this connection there is provided a thermocouple 68 as a primary element for the temperature measurement by temperature measuring instrument 72. The temperature measuring instrument 72 then produces on its output line 74 a signal representative of the temperature of the exhaust gases in the region in which the differential pressure measurement is made by the instrument 50. This temperature representing signal on line 74 is introduced through isolating amplifier 76 as another input on line 78 to dividing network 62.

As a result of the division carried out by the network 62 a signal is provided at the output of the dividing network 62, namely at line 80. That signal is then introduced into a square root extracting network, shown as amplifier 84. The output of amplifier 84 is then introduced by way of line 86 into a sign changing amplifier 88 which in turn produces on line 89 one of the inputs to the multiplying network 90.

The other signal input to network 90 is by way of line 92, the source for which will now be explained.

It is necessary to correct for the amount of water vapor in the exhaust gases since the gas analysis, to be described later, is generally on the basis of the concentrations in a dried sample of the exhaust gases. This correction is effectively a correction for the amount of water vapor introduced into the exhaust gases by the water spray 28 and can be determined by comparing the temperature of the exhaust gases and the rate of production of carbon dioxide by the refining process. It will be evident that an increased production of carbon dioxide would be indicative of an increased release of heat by the metal bath 12 which would in turn cause more water vapor to be evaporated from the water sprayed into the spark box 27. On the other hand a temperature increase in the exhaust gases would be indicative of a decrease in the amount of water vapor being evaporated if that increase is not accompanied by a corresponding increase in the carbon dioxide produced in the refining process. It is thus possible to obtain an inferential indication of the moisture content of the exhaust gases in duct 30 at a point after the water spray by utilizing the signal on line 74, which is representative of the temperature in that duct, and a signal on line 94 indicative of the concentration of carbon dioxide in the gases in duct 30 as a result of the refining process.

The signal on line 94 may be produced in a well known manner, namely, by the use of infrared gas analysis equipment. This gas analysis equipment draws a sample from the exhaust duct 30 through sample line 98 into the gas sampler 100. In gas sampler 100 the gas is analyzed not only for the percentage of carbon dioxide present but also for the percentage of carbon monoxide present in terms of mols of gas per mol of dry exhaust gas. There is therefore produced two outputs from analyzer 100. The signal on output line 104 is indicative of the percentage of carbon dioxide in the exhaust gases on a dry gas basis; this signal has its sign changed by the changing amplifier 106 which produces the signal on line 94.

There is also required for the inferential water vapor indication a signal which will represent unity. This signal is provided on line 108 from a constant potential source +E. The lines 74, 108 and 94 are input lines to operational amplifier 110 which is effective to compare the signal on line 74 with the sum of the signals on line 94 and line 108. It will be obvious to those skilled in the art that the necessary constants may be introduced by the appropriate selection of input resistance values for amplifier 110 for the several inputs from lines 74, 94 and 108. The output of amplifier 110 on line 92 is therefore a signal representing the ratio of the amount of dry gas in the exhaust gases to the amount of wet gas in the exhaust gases. The amount of wet gas is considered to be the amount of dry gas plus the amount of water vapor in the exhaust gases.

As mentioned previously, the signal from lines 89 and 92 are multiplied by the multiplying network 90 to produce on output line 120 a signal indicative of the flow of dry gas in the exhaust duct 30. The signal on line 120 is amplified by amplifier 122 which may be a non-inverting type of amplifier so as to produce on line 124 the amplified signal representative of the mols of dry gas being exhausted from the process.

The multiplication of the signals on lines 89 and 92 may be eliminated in those cases where the analyzer 100 and its sample line 98 are constructed to maintain the exhaust gases above their dew point. In such a case the gas analysis would be on the basis of wet gases and compensation for water vapor would not be necessary.

In order to determine from measurements of the exhaust gases from the refining process the rate at which carbon is being lost by the bath 12, it is necessary to multiply the signal on line 124 by a signal introduced on line 126, indicative of the mols of carbon which are being lost by the bath 12 per mol of dry gas in the exhaust system.

The signal on line 126 is obtained by summing the signal on line 130, which is the same signal as the signal on line 104, with the signal on line 132, which is shown as one of the outputs of the gas analyzer 100 and is indicative of the percentage concentration of carbon monoxide in the exhaust gases on a dry gas basis. The signals from lines 130 and 132 are introduced as inputs into operational amplifier 134. This amplifier by summing its inputs then produces an output signal on line 126 indicative of the concentration of carbon in the exhaust gases on a dry gas basis.

The signals from lines 124 and 126 are multiplied by the multiplying network 138 to produce on its output line 139 a signal which by way of amplifier 140 provides a signal on line 142 representative of the carbon loss rate for the entire bath 12 of the refining process.

In order to convert the signal on line 142 to the percentage of carbon lost per minute in the bath 12, the signal on line 142 is introduced into a voltage divider comprising series coupled resistors 146 and 148 which connect line 142 to ground. The resistor 146 is a variable resistor having a tap 146A connected to its upper terminal 152. The position of the tap is adjusted through the mechanical coupling 146B by knob 156 so as to provide a voltage division in accordance with the bath metal weight. The output from the voltage divider is taken from lines 158 which are connected to opposite sides of resistor 148 and which connect to a carbon-loss recorder of 160 which records continuously the carbon-loss rate from the bath 12 in terms of percent per minute.

The signal on line 142 is also utilized to provide an indication of the percent of carbon remaining in the bath 12. Thus, the signal from line 142 is introduced through line 180 as an input to integrating amplifier 182 whose output on line 184 is introduced into a voltage divider network consisting of resistors 186 and 187. The resistor 186 is constructed similar to the resistor 146 in that it has a variable tap 186A which is connected to its upper terminal 200. The variable tap 186A is positioned by the mechanical coupling 186B which is connected to the adjustable knob 156 in the same manner as is the mechanical coupling 146B. Thus the variable tap 186A is adjusted at the same time variable tap 146A is adjusted. As a consequence of the voltage division in accordance with the metal bath weight there is obtained on the lines 210 which are connected to opposite sides of resistor 187 a potential, which is a measure of the total carbon lost by the bath 12. To obtain a measure of the remaining bath carbon percentage on recorder 212 which is connected to lines 210 it is necessary to introduce the percent carbon at the start of the process as a constant from which the percentage of carbon lost may be subtracted. For this purpose resistor 213 is connected at one end to potential source +E and at its other end to ground. The adjustable tap 213A is positioned by mechanically coupled knob 213B to a position which will provide a potential at tap 213A representative of the percentage carbon in bath 12 at the start of the process. Tap 213A is connected by way of resistor 214 to the junction between resistors 186 and 187. The currents in resistor 187 due to the signal on line 184 and the potential at tap 213A then subtract and recorder 212 records the percentage carbon remaining in bath 12.

To provide an indication of the slag accumulating during the refining process it is also necessary to make an indirect and inferential measurement. In the present arrangement this inferential measurement is derived from a comparison of the flow of oxygen in the lance 14 with the amount of oxygen being consumed in production of carbon monoxide and carbon dioxide. This approach to measuring the slag formation on bath 12 is based on the assumption that the oxygen which does not go into the making up carbon monoxide and carbon dioxide does go into producing the oxides of the other impurity elements, which instead of being given off as a gas go into the formation of slag.

To obtain such an inferential measurement it is necessary to measure the rate of flow of high purity oxygen in pipe 40. There is thus provided a differential pressure measuring instrument 220 which is connected by the two taps 222 to opposite sides of a flow restricting device shown here as a restricting orifice plate 224. The differential pressure measuring instrument 220 provides an output on line 230 indicative of the pressure drop across orifice plate 224. The signal on line 230 is introduced through amplifier 240 to multiplying network 242 by way of line 244.

In addition to the differential pressure measurement a static pressure measurement is also made. This measurement is provided by static pressure measuring instrument 248 which is connected by way of tap 249 to pipe 40 so as to provide a static pressure measurement giving a signal on line 250 indicative of the static pressure in pipe 40. The signal on line 250 is then introduced through amplifier 252 to multiplying network 242 by way of line 254.

Both amplifiers 240 and 252 serve to provide electrical isolation for the inputs to the multiplying network 242 shown as a block. By multiplication of the inputs on lines 244 and 254 the network 242 provides an output signal on line 260 which is then introduced into the square root extracting network 262, shown as an amplifier, and there is then provided a signal on line 264 indicative of the flow of high purity oxygen in the lance 14. This calculation is in accordance with the well known approach to measuring flow, namely, by taking the square root of the product of the static pressure and the differential pressure across a restriction and dividing the result by the square root of the absolute temperature. In this particular application the absolute temperature is not variable to any significant extent and that quantity is therefore ignored in this measurement. We may, therefore, consider that the signal on line 264 is representative of the mols of oxygen per second which are provided to furnace 10 by the adjustment of valve 42.

The signal on line 264 then provides one of the inputs to operational amplifier 270. One of the other inputs to operational amplifier 270 is by way of line 272. The signal on line 272 is a signal corresponding to that on line 142 except that the sign of the signal has been changed by the intervening amplifier 276. Thus, the signal on line 272 can be considered as representing the amount of carbon monoxide which is produced in the furnace 10 in the region of the bath 12. It is characteristic of the basic oxygen process that the combination of carbon with the oxygen introduced produces in the region of the bath mostly carbon monoxide with small amounts of carbon dioxide.

Since it takes only one mol of oxygen to make two mols of carbon monoxide multiplying factors are introduced in amplifier 270 so that the input from line 264 is effectively multiplied by two while the input from line 272 is effectively multiplied by unity.

In addition to the inputs from lines 264 and 272 amplifier 270 has as a third input the signal on line 280. This signal is derived from the signal on line 272 by way of a variable tapped resistor 282 whose variable tap 282A is adjusted by knob 282B so that the signal on line 280 represents a fixed preset value for the extra amount of oxygen which is combined with carbon in the region of the bath to make the small amount of $CO_2$ which is present in that region. There will thus be utilized in the input circuit of amplifier 270 a multiplying factor for the input from line 280 which will represent unity, for it is only necessary to add a half mol of oxygen to convert carbon monoxide into carbon dioxide.

The output of amplifier 270 on line 286 is representative of the amount of oxygen supplied through lance 14 which did not go into making up carbon monoxide or carbon dioxide, for the signal on line 264 is opposite in sign compared with the signals on lines 272 and 280. The operation performed by the amplifier 270 is thus one of subtraction.

The signal on line 286 provides an input, indicative of the rate of slag formation, to integrating amplifier 290 which serves to provide on its output line 292 to the slag recorder 294 a signal indicative of the accumulated slag which is produced on the surface of bath 12. As shown in FIG. 1A and described above, the magnitude established for the signal on line 292 represents a rough approximation of the amount of slag which is formed in that the amount of the different constituent oxides of the several impurities which go to make up the slag which is formed for each mol of oxygen varies slightly from one impurity to the other. However, those impurities which make up the majority of the content of the slag are made in roughly the same portion and therefore the approach herein described is a suitable way of getting an indication of the amount of the slag produced. This indication is sufficiently accurate for the operational requirements which must be met in this refining process. The slag recorder 294 retransmits over line 293 a signal indicative of the amount of slag produced.

In addition to providing an indication of the carbon losses, the bath carbon content and the amount of slag which is being produced in the refining process, it is important that there also be available a signal which is an indication of the temperature of the bath 12 in order that the vessel 10 may be tapped when the bath is at the optimum tapping temperature. The bath temperature recorder may be recalibrated whenever the vessel 10 is turned down prior to the completion of the refining process. Such a turndown operation is usually necessary for several other important measurements and it is common practice at that time to insert into the bath 12 a thermocouple measuring device such as the presently used disposable type of thermocouple which will give a fast and accurate indication of the actual temperature of the bath 12. Having obtained an accurate measure of the bath temperature by such means the temperature recorder may be recalibrated so that any further change in its input signal as hereinafter described will maintain the recorded indication at an accurate value.

To obtain the necessary indication of changes in bath temperature from the time when the bath temperature recorder is calibrated after the last turndown of the vessel 10, it has been found desirable to compute by analog means a heat balance for the bath 12 itself. This heat balance consists of a comparison of the signals which represent heat losses with those signals which represent heat gains for the metal bath. The manner in which this calculation is carried out will be more evident from the following description of the detailed circuitry for carrying out this particular analog computation.

The heat losses from the metal bath are represented by two signals. One is introduced on line 298 as a preadjusted value determined by the positioning of tap 300A on the adjustable resistor 300 by the manual setting of knob 300B. The resistor 300 is connected at one terminal to a voltage source +E and at the other terminal to a ground connection. The signal on line 298 is adjusted to represent the vessel losses, that is the heat lost from the vessel 10 by radiation and conduction. This value is of a fairly constant magnitude and can usually be represented by a preset adjustment.

The other loss which is taken into account is the exhaust losses, that is the losses from the process due to the heat which is carried by the exhaust gases as they are exhausted through the gas recovery system. A signal representing the exhaust losses is provided on line 304 which is connected to the variable tap 306A of resistor 306 adjusted by knob 306B. One end of the resistor 306 is connected by way of line 308 to line 142 while the other side of resistor 306 is connected to a ground connection. There is thus produced on line 304 a fractional portion of the signal appearing on line 142. This fractional portion is adjusted by the manual knob 306B to be a portion representing the sensible heat lost in the exhaust gases as latent heat of the carbon monoxide and carbon dioxide in those gases and also takes into account the change in the effect of the heat losses on the temperature of the bath due to changes in the weight of the bath itself.

Both the signal on line 298 and the signal on line 304 are introduced as inputs to the integrating amplifier 310. The sum of these two signals is compared with the sum of the other signals introduced into amplifier 310. Those other signals include the various signals representing the heat gain of the bath 12 due to the heat of reaction produced by the several chemical reactions in the refining process. More particularly the heat of reaction due to the production of carbon monoxide at the region of the bath is introduced as a signal on line 312 which signal is derived directly from line 272.

In order to modify the heat balance to take into account the small amount of carbon dioxide which is introduced in the region of the bath another signal is introduced as an input to amplifier 310 on line 314. This signal is obtained by connecting line 314 to line 280. The signal on line 280 represents as previously mentioned, the carbon dioxide which is produced at the bath.

That portion of the heat of reaction affecting bath temperature, which is due to the combination of oxygen with the impurity elements that go to make up the slag, is introduced by way of line 320 and line 324. The signal on line 320 is obtained from the variable tap 321A on resistor 321 in accordance with its adjustment by knob 321B. The resistor 321 is connected at one end to line 286 and at the other end to a ground connection. Thus, the signal on line 320 is a fractional portion of the signal appearing on line 286 which signal represents the variable portion of the heat of reaction which affects bath temperature and which is related to the rate of slag formation.

The constant portion of the heat of reaction due to slag formation is introduced into amplifier 310 by way of line 324 as that portion which affects bath temperature. This signal represents a constant amount of iron oxide blown out of the refining system due to the flow of oxygen into the system while the signal on line 320 represents the amount blown out due to other causes. The correction factor introduced into the signal on line 324 is incorporated in the adjustment provided by the knob 328B, which adjusts the position of the tap 328A on resistor 328. Resistor 328 is connected to have one end coupled to line 264 and its other end coupled to a ground connection.

As previously mentioned, the several signals which are introduced as inputs into amplifier 310, namely, the signals on lines 298, 304, 312, 314, 324 and 320 are compared and integrated by amplifier 310 so as to produce an output on line 330 indicative of the change in heat of the bath 12. In order to convert the signal on line 330 to a signal representing the change in bath temperature it is necessary to introduce both the weight of the metal bath itself as well as the weight of the slag. This is accomplished by the incorporation of a voltage divider across the output line 330. This voltage divider is comprised of a series connection of resistors 332, 333 and 334. The resistors 333 and 334 are so arranged as to have a variable tap which is capable of adjustment to modify the resistance which is inserted in the circuit by these resistors. Thus resistor 334 has a variable tap 334A which is connected to the uppermost terminal of 334 and which is adjusted by means of the mechanical coupling 334B, which is in turn adjusted by knob 156 in accordance with the weight of the metal bath itself. The resistor 333 has a selective portion of its resistance shorted out by the adjustable tap 333A in accordance with the adjustment of knob 333B which adjustment is related to the weight of the slag. The input to the bath temperature recorder 339 is then derived from opposite terminals of resistor 332 by way of lines 340.

The particular means which may be used to calibrate the bath temperature recorder 339 are not shown for they may be any of a number of standard well known means forming a part of the recorder circuit. Bath temperature recorder 339 has an output line 339A which retransmits the bath temperature by providing a signal indicative of that value for the circuit of FIG. 1B.

In FIG. 1B there is shown Diat controller 400 which is utilized for the control of the oxygen flow to lance 14 with the control being executed by the movement of valve 42 from the control motor 42A in response to control signals supplied from Diat controller 400 over line 16. The Diat controller 400 may be of the type illustrated and described in U.S. Pat. 3,008,072 issued to T. W. Jenkins, Jr. et al., on Nov. 7, 1961. It will, of course, be obvious that other types of standard control circuits could be used instead of the Diat circuit. The input line 402 to Diat controller 400 may, for example, be an error signal corresponding with that error signal which appears between the lines 30 and 31 of FIG. 1 in the above referenced Jenkins patent. The Diat controller may include a manual-automatic switch 404 which provides for the switching of the control from manual operation to automatic operation. When the controller is set for manual operation by the setting of switch 404 a positioning of valve 42 may be accomplished by the adjustment of the positioning mechanism 406 which is also shown as being an element connected to Diat controller 400. The manual-automatic switch 404 would correspond to switch 50 in the above patent along with the switches 51 and 52. The positioning element 406 would correspond with the switch 77 of the Jenkins patent.

To obtain the error signal on line 402 as an input to Diat controller 400 there is provided operational amplifier 410 which serves to compare the actual value of oxygen flow as represented by a signal which appears on line 412, having been derived from a signal on line 264 by way of inverting amplifier 414. Thus, the signal on line 412 will have an increasing negative potential to represent increasing oxygen flows. The operational amplifier 410 then compares the signal appearing on line 412 to the positive potential appearing on line 416 which represents the desired value for the oxygen flow to the lance of the furnace. Thus, the signal on line 416 may be considered as the set point whereas the signal on line 412 is indicative of the actual value of the variable which controller 400 serves to control to tend to bring it to the set point.

The operator normally starts the basic oxygen furnace by achieving ignition with the oxygen flow control and the lance height control under manual supervision. During ignition the output of the Diat controller 400 on lines 16 would depend upon the adjustment of the positioning element 406.

After the ignition has been accomplished the basic oxygen process goes through an initial silicon removal phase. This is the period of the blowing operation during which essentially all of the silicon is removed from the bath. As mentioned previously, during the silicon removal phase of the blowing operation the oxygen which can be utilized directly to reduce the impurities in the iron is limited. It is thus desirable that the oxygen flow be maintained at a relatively constant value near that limit during the initial silicon removal phase. The particular constant value which is to be used may be selected by an adjustment of the variable tap 420A on resistor or potentiometer 420 as by the setting of knob 420B labeled SRR to denote that it adjusts the silicon removal rate. The potentiometer 420 is supplied from a positive potential source $+V_1$ which is supplied at terminal 426 to the upper end of potentiometer 420. The lower end of the potentiometer 420 is shown as being grounded.

From the variable tap 420A the signal representing the silicon removal rate is provided as the supply potential across potentiometer 428 by virtue of the connection of the upper end of potentiometer 428 to the variable tap 420A by means of connecting wire 429. The variable tap 428A whose position is adjusted by knob 428B then taps off from the potentiometer 428, whose lower terminal is grounded, a potential which is plus in polarity and which represents the silicon removal rate in a quantitative term as compared with the signal on line 429, which represented the silicon removal rate on a basis of percentage. The knob 428B is adjusted in accordance with the actual silicon content of the hot metal charged in the furnace and is represented by the notation SIC.

During the initial phase of the blowing operation the signal supplied from tap 428A to line 430 and then to operational amplifier 432 is the signal which determines the output of amplifier 432 on line 434, which will be of a negative potential and which is introduced as an input to amplifier 436. The other input to amplifier 432 other than that from line 430 comes from line 440. This input will be zero during the initial phase of the blowing operation as will be explained subsequently.

For the moment assuming that there is a zero potential signal on input line 442 to amplifier 436 it will then be evident that with movable relay contact 444A in contact with upper stationary contact 444B as a result of a de-energized condition for relay 444 the signal which appears on line 416 to amplifier 410 will then be of magnitude determined by that appearing on line 430. Thus, during the initial silicon removal phase of the blowing operation the adjustment SRR made by knob 420B and the adjustment SIC made by knob 428B would be determinative of the set point for the oxygen flow, as established on line 416. Since, however, the bath carbon loss rate as represented by the signal on line 142 is introduced as a positive feedback signal into amplifier 522 on line 523, a signal will appear on line 442 to modify the set point so that increased carbon loss rates during this initial part of the blow will cause corresponding increases in the oxygen flow set points established as the blow progresses. This positive feedback signal may be omitted if desired. With such an omission the oxygen flow set point will remain substantially constant during the silicon removal phase.

If the actual oxygen flow as represented by the signal on line 412 does not equal the set point signal on line 416 an output will appear on line 402 from amplifier 410 which will cause the Diat controller 400 to send a signal on one of the lines 16 to a control motor 42A so as to properly move the valve 42 by way of linkage 42B to tend to correct for the inequality between the signals on lines 412 and 416 and to thereby correct the oxygen flow to the lance 14 to the desired value established by the setting SRR and SIC and the positive feedback signal on line 523.

Amplifier 436 includes a limit circuit to prevent the output which appears at the contact 444B from exceeding a certain value, namely, the maximum oxygen flow which is allowed (MFX). This limit is established by means of potentiometer 450 which has a variable tap 450A adjusted by a setter 450B. A negative potential $-V_2$ connects to the terminal of 450 opposite its connection to 444A. Thus, there is provided a feedback line for amplifier 436 which includes a diode 452. When the potential on the output of amplifier 436 exceeds the preset maximum oxygen flow allowed the potential at 450A becomes positive and the diode 452 becomes conductive so as to tend to limit the output of amplifier 436.

After substantially all of the silicon has been removed from the bath it is desirable that the oxygen flow be increased at a maximum possible rate consistent with the prevention of undesirable actions in the process. To detect the point at which the initial phase or silicon removal phase of the blow has been completed the carbon removal efficiency (CRE), essentially the ratio of the carbon-loss rate to the lance oxygen flow, which is represented by a signal on line 460 is compared with the finish silicon blow (FSB) set level as established by the adjustment of knob 462A of potentiometer 462. FSB is indicative of the point in the blow at which substantially all of the silicon will have been removed. That is the point when the silicon reaches .05, approximately. The carbon removal efficiency signal quantitatively represents the actual efficiency of carbon removal and is computed from actual carbon loss rate (CLR) and the oxygen flow carbon equivalent (XFCE) as will be described.

As shown in FIG. 1A the finish silicon blow level established by the adjustment of knob 462B provides a signal potential on line 464 from the movable tap 462A. The potentiometer 462 itself is supplied by a source connected to its upper terminal, namely, a source having a potential $-V_1$. The lower terminal of potentiometer 462 is connected to ground.

The potential which appears on line 464 is compared with that appearing on line 460 by relay amplifier 466 which produces an output on line 468 to energize latching relay 470 when the potential on line 460 exceeds that on line 464. Latching relay 470 with latching mechanism 471 has an upper movable contact 470A which is pulled into contact with the lower stationary contact 470B upon energization of relay 470 when the carbon removal efficiency has reached or exceeded the finish silicon blow level. The lower contact 470B is connected to a potentiometer 472 which has an adjustable tap 472A adjustable by knob 472B to provide the desired potential at contact 470B. This potential represents the carbon loss rate increase (CLRI). That is the rate at which the carbon loss rate and hence the oxygen flow can be increased during the period after the silicon blow.

The potentiometer 472 is supplied from potential source $-V_1$ which is connected to the upper terminal. The lower terminal of potentiometer 472 is connected to ground, as shown in FIG. 1B. As relay 470 is energized when the carbon removal efficiency exceeds the finish silicon blow setting the signal obtained from potentiometer 472 is introduced by an input line 474 into integrating operational amplifier 476 so as to produce an output on line 440 which is a constantly increasing signal potential. This constantly increasing signal potential on line 440 adds to the signal potential on line 430 so that they both provide inputs to amplifier 432 which are of the same polarity. Therefore, the output of amplifier 432 on line 434 increases in a linear fashion from the constant value as established previously by the settings SRR and SIC in accordance with the setting CLRI. It will be evident that during the silicon blow contact 470A would be disconnected from contact 470B and as a result with amplifier 476 reset the potential on line 440 would be zero.

As explained previously, the signal on line 434 is effective to change the signal on line 402 into the Diat controller by virtue of the fact that it changes the potential appearing on line 416 which is indicative of the set point for the oxygen flow to the lance of the furnace. It will be evident therefore that after the silicon blow the set point will increase linearly as a result of the signal change on line 434; however, a modification of the set point will also be introduced by a changing signal on line 442 due to a change in the carbon loss rate signal on line 142 by way of the positive feedback previously mentioned, and further explained in the subsequent description.

The carbon removal efficiency signal (CRE) which is presented on line 460 is produced as an output from the dividing network 480 and is derived by dividing the carbon loss rate (CLR) as represented by the signal on line 142 by the oxygen flow carbon equivalent (XFCE) as derived from potentiometer 482. Thus, the dividing network 480 receives as one of its inputs, the dividend, a signal from line 142 over input line 484 whereas the other input, representing the devisor, is received on input line 486 from the variable tap 482A of potentiometer 482. The variable tap is adjusted as shown by the setting of knob 482B in accordance with the oxygen flow carbon equivalent. The oxygen flow carbon equivalent signal (XFCE) represents the theoretical carbon loss equivalent at maximum efficiency (100% CL) of the oxygen being fed to the process through the lance. The oxygen flow carbon equivalent which appears on line 486 is as mentioned derived from potentiometer 482 which is in turn supplied by a signal derived from line 264, which is indicative of the oxygen flow to the lance.

The oxygen flow signal appearing on line 264 is connected to the uppermost terminal of the potentiometer 482 through a lag network 487. The lag network 487 is connected to line 264 by an input line 488 which is coupled serially to resistors 489 and 490. The point at which the resistors 489 and 490 join is connected through capacitor 492 to ground. The resistor 490 leads to the input of an operational amplifier 493 whose output is to line 494 to the uppermost terminal of potentiometer 482. The operational amplifier 493 has as feedback elements capacitor 496 and its shunting resistor 498.

These feedback elements in conjunction with amplifier 493 form a lag network which produce an additional lag to that produced by resistors 489 and 490 in combination with capacitor 492. The purpose of the serial lags of network 487 is to establish a lag in the signal derived from measured oxygen flow comparable to that which is inherent in the derivation of carbon loss rate (CLR) by indirect means.

The control of oxygen flow to the lance should preferably be such that the flow is at maximum, both during the silicon removal phase as well as the remaining portion of the blow, but it must also be of such a value that slopping is avoided. To provide for the avoidance of slopping which could occur after the silicon removal phase an input to amplifier 436 on line 442 is provided from amplifier 522 in response to the signal on line 520. This signal is derived from the carbon loss rate signal which appears on line 142 by way of a rate type network 500. The rate type network 500 includes a variable capacitor 502 in series with a variable resistor 504 in the input line 506 to operational amplifier 508. The operational amplifier 508 is shunted by resistor 509 so that there is produced on the output line 510 of the rate type network 500 a signal which changes in accordance with the rate of change of the signal on line 142. The rate type circuit 500 therefore introduces on line 510 a signal which can be used to cause quick changes in the oxygen flow in response to a rapid change in carbon loss rate such as are necessary to maintain the reaction in the bath stable after the silicon blow phase.

The signal appearing on line 510 provides the potential for potentiometer 514 since line 510 is connected to the upper terminal of potentiometer 514 whose lower terminal is connected to ground. Potentiometer 514 has a variable tap 514A which is adjusted by knob 514B so as to present on line 516 signal which is a portion of that appearing on line 510.

Line 516 is an input line to a dead-band circuit 518. The dead-band circuit 518 may be any one of a number of circuits which will create a dead-band so that the signal 516 may vary within predetermined limits before producing on the output line of circuit 518, namely on line 520, a signal indicating a desired change in the oxygen flow rate required in response to the changing carbon loss rate as detected from a change in potential on line 142.

The signal on line 520 is introduced into an inverting amplifier 522 so as to produce on line 442 a signal of positive potential which will by virtue of operational amplifier 436 tend to decrease the effect of the signal on line 434 in determining the potential which appears on line 416, which represents the set point for the oxygen flow.

Another signal introduced into amplifier 522 appears on line 523. This signal is preferably derived through a lag network comprised of resistor 521 and capacitor 519 from the variable tap 525A adjusted by knob 525B so as to tap off a portion of the potential across slidewire resistor 525. The resistor 525 is connected at its uppermost terminal to wire 526 which connects to the carbon loss rate signal on line 142. The other terminal of resistor 525 is grounded.

It will be evident that the introduction of a portion of the carbon loss rate signal into amplifier 522 as previously mentioned provides a positive feedback effect on the oxygen flow control. This effect is useful primarily in accelerating the flow of oxygen to the bath by relating the oxygen flow set point to the carbon loss rate. When the increasing carbon loss rate during the silicon blow indicates that the particular bath being refined is capable of utilizing an amount of oxygen in excess of that normally useable, the computed oxygen flow set point will be correspondingly increased. This positive feedback is particularly useful during the silicon removal phase when the oxygen flow would otherwise be restricted to an amount which would not be excessive for any particular heat. The positive feedback when properly tuned to the process by knob 525B thus provides a means for shortening total blowing time as much as possible for each heat. It is, of course, possible to omit the positive feedback circuit described and allow all heats to have the same constant oxygen flow during the silicon blow phase if such a mode of operation is desired.

In summary, the blowing practice which provides optimum results in a basic oxygen furnace includes a control of oxygen flow to the lance such that the process starts with a substantially constant oxygen flow in the initial silicon removal phase which is modified by the actual carbon loss rate from the bath. This modification can under some circumstances become a substantial factor for increasing the oxygen flow during the silicon removal phase. Upon detection of the end of that silicon removal phase as by the arrival of the carbon removal efficiency signal to a predetermined finish silicon blow level, the oxygen flow is then further increased at a constant maximum rate of change which is modified only when the rate signal on line 520 indicates a rapid carbon loss rate change indicative of a condition conducive to slopping. To prevent slopping a rapid increase in the carbon loss rate causes a decrease in the oxygen flow set point as established on line 416 by virtue of the operation of the rate circuit 500 whenever the carbon loss rate increase is of such a magnitude that the signal on line 516 exceeds the dead-band established by the dead-band circuit 518.

The height of the lance 14 above the bath 12 in the basic oxygen furnace 10 as shown in FIG. 1A is adjustable by the control of the position of motor shaft 15A of motor 15 which serves to position pinion gear 14B and alter the position of rack 14A and hence the position of the lance 14 in response to the signals to the motor 15 on lines 17. The control signals appearing on lines 17 are produced by the Diat controller 600 which is similar to the Diat controller 400 and which likewise has a manual-automatic switch 604 and a positioning element 606 which operate in the same manner as do the manual-automatic switching element 404 and the positioning element 406 of Diat controller 400. The manual positioning of the lance will be generally used only during the ignition period or under emergency conditions.

The input to the Diat controller, the error signal which determines the control signals to be supplied on lines 17, is provided by way of input signal line 602 from operational amplifier 610 which has as one of its inputs line 21 which provides a signal indicative of the position of lance 14 as previously explained. The signal on line 21 is compared by amplifier 610 with the signal on line 612 which is indicative of the desired lance position, the lance set point. The manner in which the lance position set point signal is derived will now be explained in greater detail.

During the initial portion of the blowing operation the lance is desirably at its maximum height above the bath. Under those conditions the signal on line 612 is determined by the positioning of the variable tap 614A of potentiometer 614 by the adjustment of knob 614B in accordance with the desired maximum lance height (MLH). The potentiometer 614 is supplied at its upper terminal with a source of potential $+V_1$. The lower terminal of potentiometer 614 is connected to ground as shown in FIG. 1B. As a result a positive potential appears on line 616 which is connected to the movable tap 614A. Line 616 is one of the input lines to operational amplifier 618 whose output is to line 611 which is one of the input lines to amplifier 613 whose output is in turn connected as an input to amplifier 615. The output of amplifier 615 then connects by way of the upper stationary contact 444D and movable contact 444E of deenergized relay 444 to line 612. When relay 444 is energized contact 444E contacts contact 444F, the lower stationary contact. Contact 444F is connected to ground.

During the initial portion of the blowing cycle, as mentioned, the lance height is desirably at its maximum and the signal on line 616 is the signal which determines that lance position, since the other inputs to the amplifier 618 will be at a zero level at that time and contact 444E will be in contact with 444D.

The desirable operation with regard to the lance height during the blowing of a basic oxygen furnace requires that the lance height be gradually decreased from its maximum value as the slag cover of the bath builds up. The lance is desirably maintained as close as possible to the bath, however, it is necessary that the lance height be maintained at a value such that sparking will not damage the lance. As a consequence of the lack of a slag cover on the bath during the initial portions of the blowing cycle, the lance must be maintained at a greater height above the bath than would normally be desirable. As the slag cover builds up the lance can be safely lowered to a position more closely proximate to the bath and therefore a position at which the efficiency of operation is increased. The change in lance height is therefore desirably made in direct proportion to the build up of slag on the bath. To tie the lance height set point signal on line 612 to the amount of slag which is being built up on the bath, the retransmitted signal on line 293 from the slag recorder 294 in FIG. 1A is utilized to provide one of the inputs to amplifier 618. This input is provided through diode 620 in line 293. The signal on line 293 is positive in polarity and therefore the diode is normally forward biased.

The positive signal supplied on line 616 must be of a lower magnitude for higher maximum lance heights. Therefore, as the adjustable tap 614A is moved down on potentiometer 614 the maximum lance height is increased. It will also be evident that the potential at variable tap 19A of slidewire 19 in FIG. 1A must be so connected to motor 15 that it becomes more positive as the lance is brought nearer the bath.

Interposed in line 293 is an adjustable tapped resistor 630 having an adjustable tap 630A adjusted by the knob 630B to provide for a modification of the potential on line 293A in accordance with the desired lance height decreased rate (LHDR).

As the slag buildup continues and is measured and recorded by slag recorder 294 the retransmitted value on line 293 continues to increase as does the signal on line 293A to amplifier 618. The signal on line 293A then is added to the signal on line 616 and the lance height set point, as produced by amplifiers 618, 613 and 615 as a signal on line 612, is increased in its negative value indicating a decreased lance height above the bath. This increasing negative potential continues at a rate comparable to the rate of accumulation of slag. Under control of the Diat controller the lance height follows from its maximum position to a lower position in accordance and in direct relationship to the buildup of slag on the bath.

It is desirable that the reaction zone be kept at approximately the same level or at least that the reaction zone should not be altered rapidly in the bath. Therefore, there is introduced into the lance height control circuit a signal which appears on line 640 as an input to amplifier 618, which is related to the rate of change of oxygen flow set point as established on line 416. The object is to modify the lance height when there is a rapid change programmed for the oxygen flow as by a change in the oxygen flow, set point so that the combination of oxygen flow, and lance height will serve to maintain as nearly as possible a consistent level for the reaction zone, or at least the effect will be that the changes in the reaction zone level will be slowed to acceptable magnitudes.

To establish this type of operation there is introduced between line 416 and line 640 a rate type circuit 642 which is comprised of a series connected variable capacitor 643 and variable resistor 646 between line 416 and the input to an operation amplifier 648. The operational amplifier 648 has as a feedback a resistor 650 so that there is produced on the output line of amplifier 648, namely line 652, a signal which is a function of the rate of change of the signal on line 416. This particular function is such that a rapid change in the signal on line 416 will cause an immediate change of the signal on line 652 but the signal established on line 652 will then gradually diminish so that the signal will approach a value related directly to that appearing on line 416.

The potential appearing on line 652 provides the potential across potentiometer 660 since line 652 is connected to the upper terminal of potentiometer 660 whose lower terminal is connected to ground. Potentiometer 660 has a variable tap 660A which is adjusted by knob 660B and which is connected through the dead-band circuit represented by block 662 to input line 640 of amplifier 618.

The dead-band circuit represented by block 662 would be of the same type as that represented by block 518 and would have for its purpose the setting up of a dead-band in which no change in signal on line 640 would occur in response to changes in signal on the variable tap 660A.

The input to amplifier 618 on line 640 will be of a negative potential and therefore a rapid increase of the oxygen flow set point as indicated by a rapid change in the signal on line 416 would cause an increased negative potential on line 640 and hence a decreased negative potential on line 612 which would represent an increase in the desired height of the lance above the bath. The resultant effect through the operation of the Diat controller 600 causes the motor 15 to raise the lance 14 in compensation for the increased oxygen flow so as to tend to maintain the location of the reaction in the bath substantially at the same position.

In some situations the signal representing the slag cover may fail to build up at a constant or sufficiently constant rate and in some instances may in fact fall off after an initial buildup. Under such conditions it is necessary to introduce a signal which will override the signal indicative of the slag cover which appears on line 293. By using such a signal the constant decrease in the lance height may be continued under those conditions where the slag buildup signal for some reason is temporarily reduced.

For this purpose there is provided in FIG. 1B on line 670 a signal related to the integral of the oxygen flow to the lance. This signal is derived as the output signal of operational amplifier 672 which is the integrating amplifier which obtains its input signal from line 674 which is connected to the variable tap 676A of potentiometer 676. The potentiometer 676 is supplied at its upper terminal with a potential derived from the output of amplifier 414 on line 412. The other terminal of potentiometer 676 is connected to ground. Therefore, the signal supplied on line 670 is representative of the integral of the oxygen flow rate with the rate of integration being determined by the adjustment of the variable tap 676A.

Diode 680 is interposed in line 670 so that it is forward biased by positive potential on line 670 to carry current to line 293A. It will be evident from FIG. 1B that whenever the slag signal on line 293 is below the integrated oxygen flow signal on line 670, the diode 620 would then be back biased and the signal which would be effective on line 293A would be that from line 670. Likewise, as long as the slag signal on line 293 is above the integrated oxygen flow signal on line 670, the diode 680 is back biased and the slag signal on line 293 is the signal which is effective in determining the potential on line 293A.

Amplifier 618 which establishes on line 612 a set point for the control of the lance height includes in shunt therewith a limit circuit similar in construction to the limit circuit shown for amplifier 436. The limit circuit for amplifier 618 is shown as including a potentiometer 690 supplied from a source of potential $+V_2$ by way of resistor 691 which connects to the upper terminal of resistor 690 and to its variable tap 690A. The lower terminal of resistor 690 is connected to line 611. Variable tap 690A, adjusted by knob 690B, provides a potential which will back bias diode 700, connected between the variable tap 690A and input line 702 of amplifier 618. The adjustment of knob 690B serves to adjust the minimum lance height (LHM) and therefore the adjustment of the variable tap 690 determines the minimum set point which can be established by a signal on line 612 so as to prevent the control of the lance height to a dangerously low level at which damage to the lance might occur due to the extreme conditions close to the bath surface.

In order to vary the minimum lane height to prevent excessive penetration of the oxygen into the bath, the oxygen flow signal from line 412 is introduced to the junction point between potentiometer 690 and resistor 691 by way of variable resistor 692. Higher oxygen flow as evidenced by the magnitude of the signal on line 412, therefore, will have the effect of raising the effective minimum lance height.

It also may be dsirable to bias both the maximum and minimum lance height upward for higher than normal bath levels in the furnace 10 and to decrease the effective maximum and minimum lance heights for lower than normal bath levels and vice versa. This is accomplished by introducing as a second signal into amplifier 613 a signal from line 617 as established by adjusting variable tap 619A on potentiometer 619 from knob 619B in accordance with the weight of bath 12.

As shown in FIG. 1B potentiometer 619 is supplied at its upper terminal by a potential source $-V_2$. The variable tap 619A would thus be moved upward on potentiometer 619 for higher bath weights.

To terminate the blowing operation it is necessary to shut off the oxygen flow to the lance and to raise the lance. To accomplish the oxygen shut-off operation relay 444 is provided with a contact 44A which is pulled into contact with its lower stationary contact 444C when relay 444 is energized. The stationary contact 444C is connected to ground so as to establish on line 416 a zero potential level representing a set point for the oxygen flow to the lance corresponding with zero flow. Also, energization of relay 444 causes contacts 444E and 444F to contact so that the set point for the lance height is at ground potential representing the highest possible lance height.

With the circuit as shown in FIG. 1B the energization of relay 444 requires that three particular conditions be met. These conditions are represented separately by the energization of relay 470, the energization of relay 710, and the energization of relay 712.

It is desirable to finish the blowing operation when both the carbon content of the bath and the temperature of the bath are within predetermined ranges. This is accomplished by establishing a maximum finish carbon (MFC) and a minimum finish temperature (FTM) both of which must be reached before the oxygen is shut off. The other condition, which is shown as being a necessary condition for the shut-off of the oxygen flow, is the energization of relay 470 as a result of the carbon removal efficiency having reached a point indicative of the end of the silicon blow phase of the blowing operation. When the CRE signal is sufficient to exceed FSB as established by relay amplifier 466 relay 470 is energized so as to cause the movable contact 470C of relay 470 to come into contact with the lower stationary contact 470D. Since relay 470 is a latching relay these contacts will remain in contact even though the relay could later be deenergized.

When the carbon removal efficiency (CRE) signal on line 460 reaches a point indicative of the maximum finish carbon as established by the potential on the tap 720A of potentiometer 720 in accordance with the adjustment made by knob 720B, relay amplifier 722 causes an output signal which will energize relay 712 to cause its movable contact 712A to come into contact with the lower stationary contact 712B. The comparison of the CRE signal and the potential at the tap 720A as made by amplifier 722 is possible since the CRE signal is directly related to the carbon level in the bath and therefore it is possible to use that signal to establish when the desired finish carbon has been reached.

Since the carbon removal efficiency (CRE) signal has been found to be indicative of the carbon remaining in the bath when the percentage of carbon is in the lower ranges, it may be used to obtain an indication of the carbon level. For this purpose, indicator 463 is connected by line 461 to line 460. The relationship between the CRE signal and bath carbon is such that a substantially logarithmic scale in terms of bath carbon must be used on indicator 463. Such a scale makes the low carbon points easy to read. This means for measuring the end point for low carbon heats has been found to be generally more accurate than the use of recorder 212, although for high carbon heats, the indications obtained from recorder 212 are generally found to be more useful than those from indicator 463.

Since it is also desired that the finish temperature be within a particular range when the oxygen is shut off, the signal on line 339A which is derived from bath temperature recorder 339 of FIG. 1A as a retransmitted signal indicative of the bath temperature is utilized as one of the inputs to relay amplifier 730. The other input to relay amplifier 730 is taken from the movable contact 732A of potentiometer 732 as adjusted by knob 732B. This adjustment is made so that the potential on contact 732A is indicative of the minimum finished temperature (FTM). Thus when the signal on line 339A exceeds the potential on contact 732A, relay amplifier 730 produces an output which energizes relay 710 to pull the movable contact 710A into contact with the lower stationary contact 710B.

When relay contacts 712A and 712B are in contact, the relay contacts 470C and 470D are in contact and the contacts 710A and 710B are in contact as a result of the energization of the respective relays 712, 470 and 710 then the potential $+V_1$ which is connected to the movable contact 712A is applied through line 734 to relay 444 to energize that relay and pull in its movable contact 444A into contact with the lower stationary contact 444C so as to establish a zero or ground potential on line 416 indicative of the set point for the oxygen flow. The oxygen flow is then controlled by Diat controller 400 in such a manner that the valve 42B is shut off. Likewise 444E is pulled into contact with 444F and ground potential appears on line 612 and controller 600 moves the lance up to its highest position.

Under some conditions it is likely that it would be satisfactory to operate in such a fashion that the relay contacts 470C and 470D would be omitted as well as the relay contacts 710A and 710B indicative of a minimum finish temperature. In such a case the shutting off of the oxygen and the repositioning of the lance would be established on the basis of the carbon in the bath reaching the desired value.

In FIG. 2 an alternative approach to the detecting of slopping is shown. In this alternate arrangement a radiation pyrometer 800 is sighted over the top of the furnace 10 at the flames issuing therefrom. By the use of appropriate filters and by proper orientation of the element 800 the measuring and retransmitting instrument 802 which receives signals from element 800 over lines 804 can be so constructed as to produce an output signal on line 808 which can be substituted for the signal on line 142 as a basis for the slopping control. Thus, capacitor 502 of FIG. 1B could be connected to line 808 instead of line 142. Such an approach to slopping control removes the delayed response inherent in the use of a signal derived from a measurement which lags the condition to be controlled as is the case when the slopping control depends upon exhaust gas measurements to determine carbon loss rate. The detection of slopping by direct sighting of a radiation pyrometer on the flames from the furnace obviously will minimize the lag and provide a more sensitive control.

Certain modifications of the disclosed circuits can be made without altering in any substantial way the operation of the system and its usefulness in controlling basic oxygen furnaces. For example, since the carbon loss rate measured by recorder 160 is used only as an operator guide and it is the shape of the curve drawn by that recorder which is of greatest importance rather than any absolute value measured, it will be evident that the division by bath weight could be omitted and lines 158 could be connected to ground and to line 142 with resistors 146 and 148 omitted in FIG. 1A. The measurement made by the recorder would then be the carbon loss rate of the entire bath 12. The weight of the bath 12 would not normally vary to any considerable extent from heat to heat, hence the measurement of recorder 160 would have a reasonable accuracy even if calibrated on the basis of carbon loss per unit of weight.

A great number of the vessels used are of the open-hood type, that is those whose hoods 18 are positioned a sufficient distance above the vessel 10 to allow considerable air to be induced from outside the vessel as shown by arrows 22. These may be contrasted with the closed-hood vessels which allow little or no infiltration of air into the exhaust system. The circuit of this disclosure is equally applicable to both types of vessels. In the open-hood vessels, however, the CO measurement may sometimes be omitted from the analysis of exhaust gases if very little CO remains after combustion of the gases with the infiltrated air.

Another characteristic of some open-hood installations is the relative constancy of the flow of exhaust gases. When this flow is substantially constant when the variable signal provided by line 124 is no longer needed and it may be replaced with a constant signal representing the constant flow or it may be omitted entirely and the multiplier 138 may also be omitted by connecting line 126 to line 139. In the latter case, the carbon loss rate is then varied solely from the analysis of the exhaust gases.

What is claimed is:

1. The method of determining by machine the carbon content of the bath of a basic oxygen furnace comprising the steps of generating a first signal indicative of the concentration of carbon containing gases in the exhaust duct from said furnace, generating a second signal indicative of the rate of flow of oxygen into said furnace, and generating from the relationship between said first and second signals a third signal indicative of the rate of carbon removal from said furnace with respect to the rate of oxygen flow to said furnace, said third signal being indicative of the carbon content of said bath in low carbon ranges.

2. The method of determining by machine the carbon content of the bath of a basic oxygen furnace comprising the steps of generating a first signal indicative of the concentration of carbon containing gases flowing in the exhaust duct from said furnace, generating a second signal indicative of the rate of flow of the gases in said exhaust duct, generating a third signal by multiplying said first and second signals, generating a fourth signal indicative of the carbon equivalent of the rate of flow of oxygen into said furnace by way of the furnace lance, and generating a signal indicative of the carbon content of said bath when said content is in the low carbon region by dividing said third signal by said fourth signal.

3. The method of determining by machine the carbon content of the bath of a basic oxygen furnace comprising the steps of generating a first signal indicative of the concentration of carbon containing gases flowing in the exhaust duct leading from said furnace, generating a second signal indicative of the rate of flow of the gases in said exhaust duct, generating a third signal indicative of the rate of flow of oxygen into said furnace, and generating from said first, second and third signals a fourth signal indicative of the carbon content of said bath in low carbon regions, said fourth signal being a function of the relationship of the product of said first and second signals to said third signal.

4. The method of determining by machine the carbon content in the bath of a basic oxygen furnace in terms of the carbon removal efficiency which is indicative of the carbon content of the bath at lower ranges of carbon concentration which comprises, generating a first signal whose magnitude is representative of the rate at which carbon is removed from the bath, generating a second signal whose magnitude is representative of the rate of flow of oxygen into said bath, generating by means responsive to said first and said second signals a third signal representative of their ratio, the magnitude of said third signal being representative of the carbon content of the bath in the lower ranges of carbon concentration.

5. The method of claim 4 in which the flow of oxygen into said bath and into said furnace is terminated in response to a magnitude of said third signal representative of the carbon content of the bath desired at the end of the blow.

6. The method of claim 4 in which the generation of the first signal includes the steps of generating a signal whose magnitude is representative of the concentration of carbon containing gases in the exhaust gas recovery system into which the gases emanating from said basic oxygen furnace are drawn, generating another signal whose magnitude is representative of the rate of flow of gases in said exhaust gas recovery system, and generating from said concentration signal and said rate of flow signal said first signal representative of their product, the magnitude of which is representative of the rate at which carbon is removed from the bath.

7. The method for determining the carbon content of the bath of a basic oxygen furnace comprising the steps of producing in response to process measurements a first signal indicative of the concentration of carbon containing gases in the exhaust duct from said furnace, producing in response to process measurements a second signal indicative of the rate of flow of oxygen into said furnace, and producing from the relationship between said first and second signals a third signal indicative of the rate of carbon removal from said furnace with respect to the rate of oxygen flow to said furnace, said third signal being indicative of the carbon content of said bath in low carbon regions.

8. The method for determining the carbon content of the bath of a basic oxygen furnace comprising the steps of producing in response to process measurements a first signal indicative of the concentration of carbon containing gases flowing in the exhaust duct from said furnace, producing in response to process measurements a second signal indicative of the rate of flow of the gases in said exhaust duct, producing a third signal by multiplying said first and second signals, producing in response to process measurements a fourth signal indicative of the carbon equivalent of the rate of flow of oxygen into said furnace by way of the furnace lance, and dividing said third signal by said fourth signal to produce a signal indicative of the carbon content of said bath when said content is in the low carbon region.

9. The method for determining the carbon content of the bath of a basic oxygen furnace comprising the steps of producing in response to process measurements a first signal indicative of the concentration of carbon containing gases flowing in the exhaust duct leading from said furnace, producing in response to process measurements a second signal indicative of the rate of flow of the gases in said exhaust duct, producing in response to process measurements a third signal indicative of the rate of flow of oxygen into said furnace, and producing from said first, second and third signals a fourth signal indicative of the carbon content of said bath in low carbon regions, said fourth signal being a function of the relationship of the product of said first and second signals to said third signal.

10. The method for determining the carbon content in the bath of a basic oxygen furnace in terms of the carbon removal efficiency which is indicative of the carbon content of the bath at lower ranges of carbon concentration which comprises producing in response to process measurements the first signal whose magnitude is representative of the rate at which carbon is removed from the bath, producing in response to process measurements a second signal whose magnitude is representative of the rate of flow of oxygen into said bath, and producing in response to said first and said second signals a third signal representative of their ratio, the magnitude of said third signal being representative of the carbon content of the bath in the lower ranges of carbon concentration.

11. The method of claim 10 in which the flow of oxygen into said bath is terminated in response to a magnitude of said third signal representative of the carbon content of the bath desired at the end of the blow.

12. The method of claim 10 in which the production of the first signal includes the steps of producing in response to process measurements a signal whose magnitude is representative of the concentration of carbon containing gases in the exhaust gas recovery system into which the gases emanating from said basic oxygen furnace are drawn, producing in response to process measurements another signal whose magnitude is representative of the rate of flow of gases in said exhaust gas recovery system, and producing from said concentration signal and said rate of flow signal said first signal representative of their product, the magnitude of which is representative of the rate at which carbon is removed from the bath.

References Cited

UNITED STATES PATENTS

| 3,329,495 | 7/1967 | Ohta et al. | 75—60 |
| 3,372,023 | 3/1968 | Krainer et al. | 75—60 |

RICHARD O. DEAN, Primary Examiner

U.S. Cl. X.R.

23—230, 253; 235—151.1